United States Patent [19]

Schmidt et al.

[11] 4,082,357
[45] Apr. 4, 1978

[54] CONVERTIBLE VEHICLE BODY

[75] Inventors: George A. Schmidt, Langhorne; Ronald L. Zubko, Cornwells Heights; Andrew Abolins, Langhorne, all of Pa.

[73] Assignee: Strick Corporation, Fort Washington, Pa.

[21] Appl. No.: 718,106

[22] Filed: Aug. 27, 1976

[51] Int. Cl.² .............................................. B60P 1/56
[52] U.S. Cl. ....................................... 298/27; 105/243
[58] Field of Search .................... 105/243; 298/27, 28, 298/29, 30, 31, 8 H

[56] References Cited

U.S. PATENT DOCUMENTS

| 183,334 | 10/1876 | Shaffer | 105/243 |
| 288,792 | 11/1883 | Goodrich | 105/243 |
| 466,470 | 1/1892 | Souder | 105/243 |
| 537,348 | 4/1895 | Morse | 105/243 |
| 537,349 | 4/1895 | Morse | 105/243 |
| 958,575 | 5/1910 | Ansley | 105/243 |
| 1,071,029 | 8/1913 | Campbell | 105/243 |
| 3,561,368 | 2/1971 | Giesking | 105/240 |
| 3,595,175 | 7/1971 | Austill | 105/243 |
| 3,692,363 | 9/1972 | Tenebaum | 298/24 |
| 3,738,511 | 6/1973 | Lemon | 214/82 |

Primary Examiner—Drayton E. Hoffman
Assistant Examiner—George F. Abraham
Attorney, Agent, or Firm—Connolly and Hutz

[57] ABSTRACT

A highway semitrailer body converts for transporting either discrete or loose bulk cargo by either maintaining hinged slope sheets in the ends of the body latched up near the roof or inclining them down to form a continuation of the hoppers in the floor. A grating over the hoppers supports the discrete cargo or permits loose bulk cargo to pass through its openings. The slope sheets are raised and lowered by flexible belt hoists actuated from outside the body through chain and sprocket transmissions mounted under covers between pairs of vertical ribs. The slope sheets are released from their upwardly latched positions by pull rod linkages also mounted between the pairs of vertical ribs. The bottom ends of the slope sheets are firmly clamped against the floor grating by locking pawls which hold down hooks on the bottom ends of the slope sheets, which pass through spaces in the grating.

7 Claims, 9 Drawing Figures

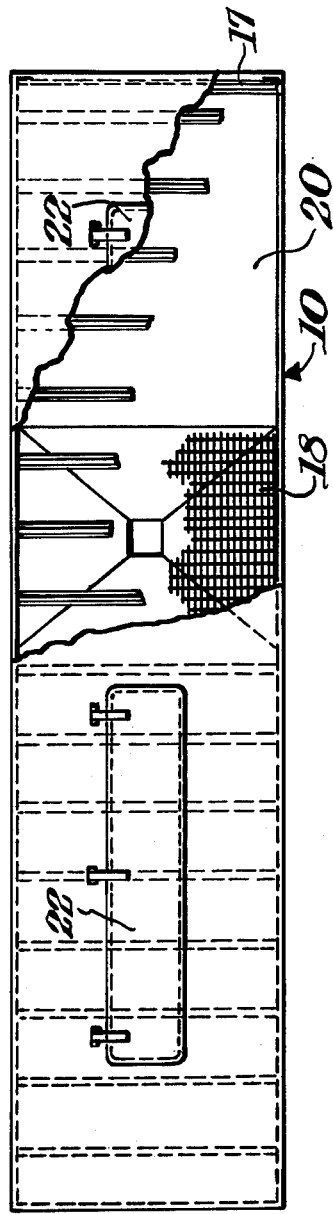
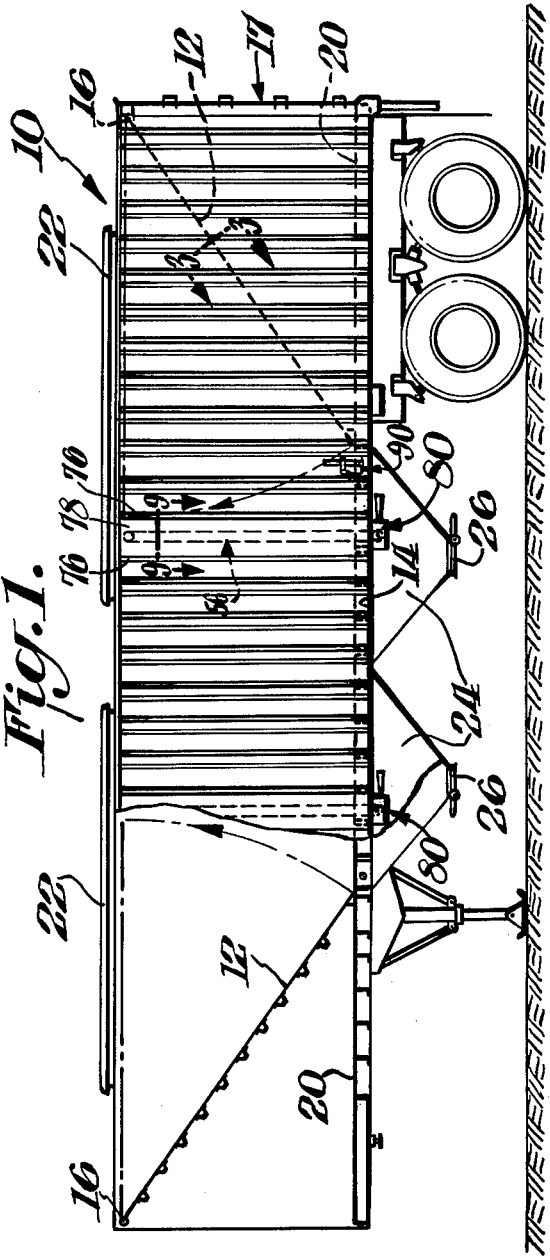

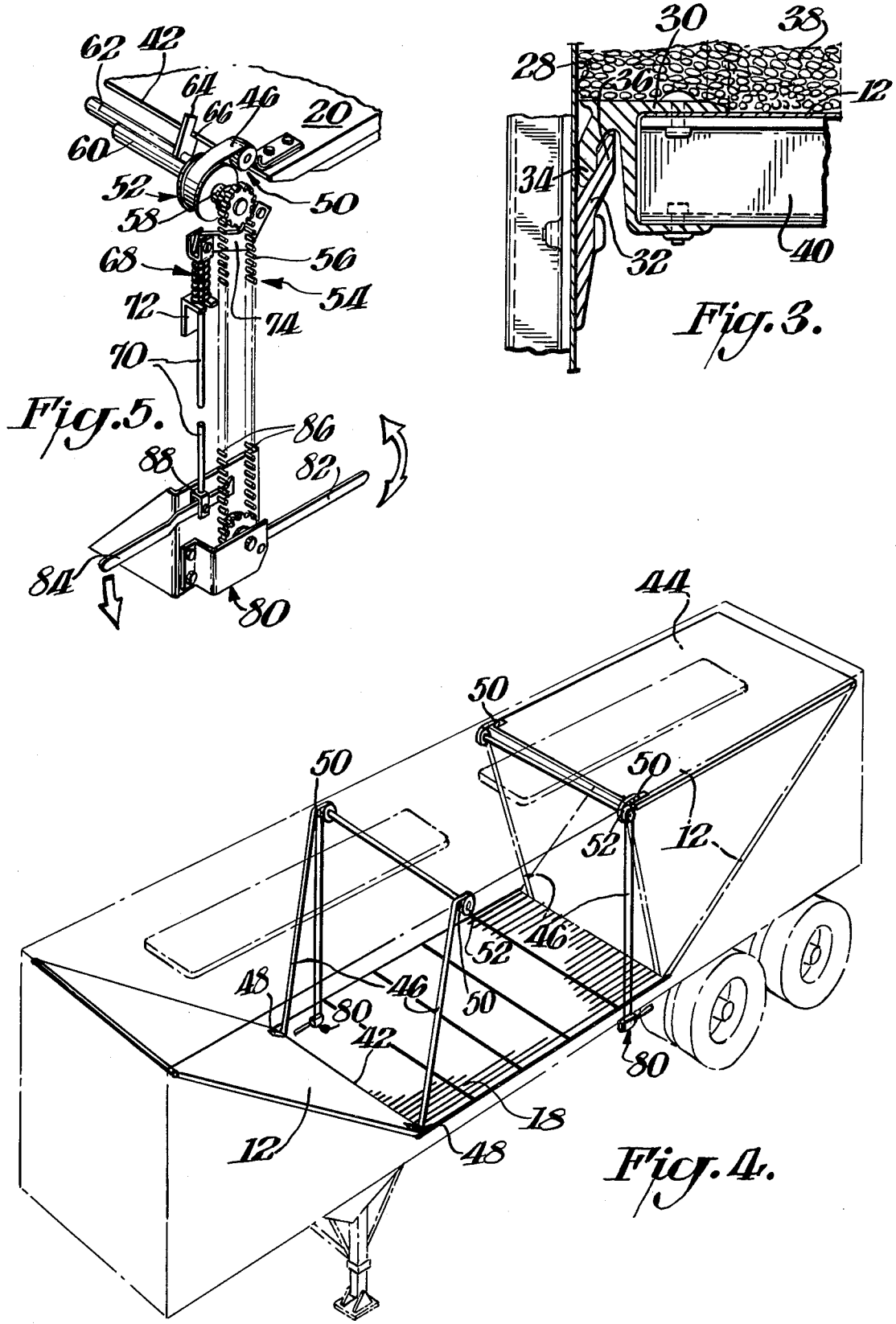

CONVERTIBLE VEHICLE BODY

BACKGROUND OF THE INVENTION

Various convertible vehicle bodies have been utilized in railroad cars and highway vehicles, particularly semitrailers, for alternatively transporting either discrete cargo or loose bulk cargo, such as grain. Such convertible bodies generally include slope sheets, which alternatively form continuations of hoppers in the floor of the bodies or stow out of the way leaving the entire length of the body free for transporting discrete cargo. An object of this invention is to provide a simple, economical and efficient structure for a convertible vehicle body.

SUMMARY

In accordance with this invention, a grating in the floor of the body over the central hoppers is strong enough to support discrete cargo and has openings for permitting loose bulk cargo to pass through it. Slope sheets are hinged under the ends of the roof in a manner which permits their free ends to be either latched upwardly near the roof or dropped downwardly into inclined positions which form continuations of the hoppers. The slope sheets may be raised and lowered on flexible belt hoists, including pairs of spools adjacent opposite sidewalls of the body, which are connected by a transverse shaft about which the latching pawls are rotatably mounted. Transmissions for the hoists and latching linkages for the pawls may be mounted under covers between pairs of vertical ribs on the outside of the bodies, and thus are actuated by handles at the bottom of the bodies. Hooks on the inner ends of the slope sheets may be clamped firmly against the grating by rotatable clamping pawls which engage them through openings in the grating.

BRIEF DESCRIPTION OF THE DRAWINGS

Novel features and advantages of the present invention will become apparent to one skilled in the art from a reading of the following detailed description in conjunction with the accompanying drawings wherein similar reference characters refer to similar parts and in which:

FIG. 1 is a side view in elevation of the vehicle body incorporating one embodiment of this invention;

FIG. 2 is a top plan view partly broken away of the vehicle body shown in FIG. 1;

FIG. 3 is a cross-sectional view taken through FIG. 1 along the line 3—3;

FIG. 4 is a schematic three-dimensional view of the vehicle body shown in FIGS. 1-3 with one end in position for transporting discrete cargo and the other end in position for transporting loose bulk cargo;

FIG. 5 is an enlarged three-dimensional view of the slope sheet hoisting and latching mechanism used in the embodiment shown in FIGS. 1-4;

DESCRIPTION OF THE PREFERRED EMBODIMENT

Figure 6:
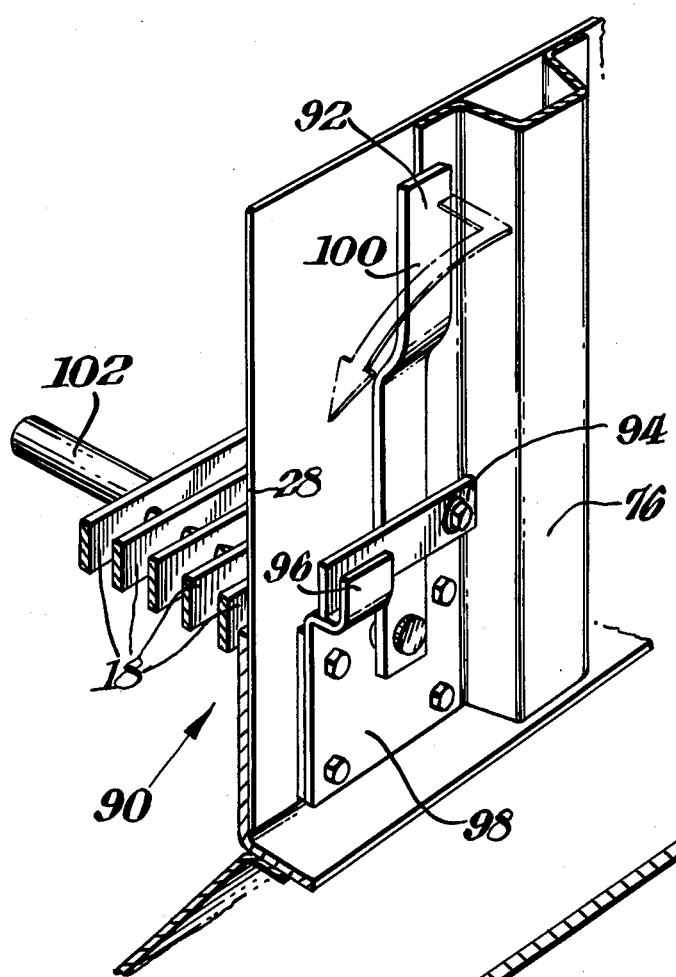
FIG. 6 is a three-dimensional view of the mechanism for clamping the bottoms of the slope sheets against the floor grating.

In FIGS. 1-3 is shown a semitrailer body 10 which is convertible. It transports loose bulk cargo in the arrangement shown in FIG. 1 in which slope sheets 12 form an inclined continuation of central hopper section 14. It transports discrete (box or crate) cargo throughout the entire length of the body when the hinged slope sheets 12 are rotated upwardly about end hinges 16 adjacent the roof body as later described. End doors 17 permit discrete cargo to be loaded and unloaded.

FIG. 2 shows steel or aluminum grating 18 over the hopper area which has openings through it large enough to permit loose bulk cargo, such as grain, to pass through it. Grating 18 is also strong enough to support discrete cargo, such as crates or boxes, in conjunction with the standard wooden floor 20 over the ends of the body on both ends of grating 18. Access for loading loose bulk cargo is provided through hatches 22. A pair of hoppers 24, are, for example, disposed under grating 18 and are closed by manually-operable gates 26.

FIG. 3 shows how slope sheets 12 are sealed against sidewalls 28. Protruding edges 34 and 36 of flange 30 and shelf channel 32 are tapered to facilitate engagement, which seals the space between slope sheet 12 and sidewall 28 against flow of loose bulk cargo, such as grain 38 between them. Slope sheet 12 are reinforced by channel-shaped ribs 40 attached underneath them.

FIG. 4 shows slope sheet 12 at the lefthand end of the figure in the lowered position in which bottom edge 42 is in contact with grating 18 in position for transporting and discharging loose bulk cargo. Slope sheet 12 at the righthand end of FIG. 4 is in the upwardly latched position adjacent roof 44 in which it is latched by a mechanism shown in FIG. 5. FIG. 4 also shows flexible belts or webs 46 attached to the lower corners 48 of slope sheets 12, which bend about idler rollers 50 rotatably mounted under roof 44 and wind upon spools 52.

FIG. 5 shows details of hoisting mechanism 54 including flexible belts 46, idler rollers 50 and spools 52 in conjunction with chain and sprocket transmissions 56 mounted on stub shaft-continuations 58 of transverse shaft 60 rotatably mounted between sidewalls 28 under roof 44. Shaft 62 is also rotatably mounted close to transverse shaft 60. Latching lugs 64 are secured upon shaft 62 and have locking shoulders 66 for engaging under the free edge 42 of slope sheet 12 to hold it in the raised position. Locking lugs 64 are resiliently urged into the latched position by compression spring 68 disposed about the upper end of pull rod 70 and which reacts against slotted bracket 72 to rotate curved link 74 and shaft 62 (to which it is attached) in the clockwise direction. Free edge 42 can accordingly push latching lug 64 aside when it moves upwardly to engage free edge 42 of slope sheet 12 on latching shoulder 66. Movement of pull rod 70 downwardly rotates latching lugs 64 in a counterclockwise direction to disengage them from the free end 42 of slope sheet 12 and allow it to be lowered.

Figure 9:
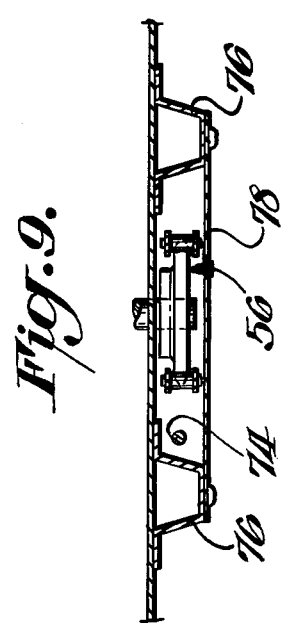
FIG. 9 is a cross-sectional view taken through FIG. 1 along the line 9—9.

As also shown in FIGS. 1 and 9 sprocket chain transmission 56 and pull rod linkage 74 are mounted between a pair of extended vertical ribs or sidewall posts 76, and are concealed under cover 78 attached across the pair of posts 76. Operating handle mechanism 80 extends below cover 78 at the bottom of body 10 and is, for example, of the ratchet type with downward and upward movement of operating handle 82 actuating upward or downward movement of free edge 42 of slope sheet 12. Unlatching lever 84 is connected by pivot 86 to body 10 adjacent ratchet mechanism 80 and is attached to the bottom of pull rod 70 by clevis 88. Downward movement of lever 84 accordingly unlatches latching lugs 64 from free edge 42 of slope sheet 12.

FIG. 6 shows portions of clamping mechanism 90 operated by clamping handle 92 mounted between another pair of side posts 76 as also shown in FIG. 1. Clamping handle 92 is maintained in the clamped position against sidewall 28 by rotatable keeper 94, which engages into lip 96, which is part of bearing plate 98 secured to sidewall 28. Handle 92 has an outwardly bent upper end 100 to provide clearance for grasping it. Handle 92 is attached for rotating inner operating shaft 102 as later described. Operating shaft 102 is disposed just under grating 18.

Figure 7:
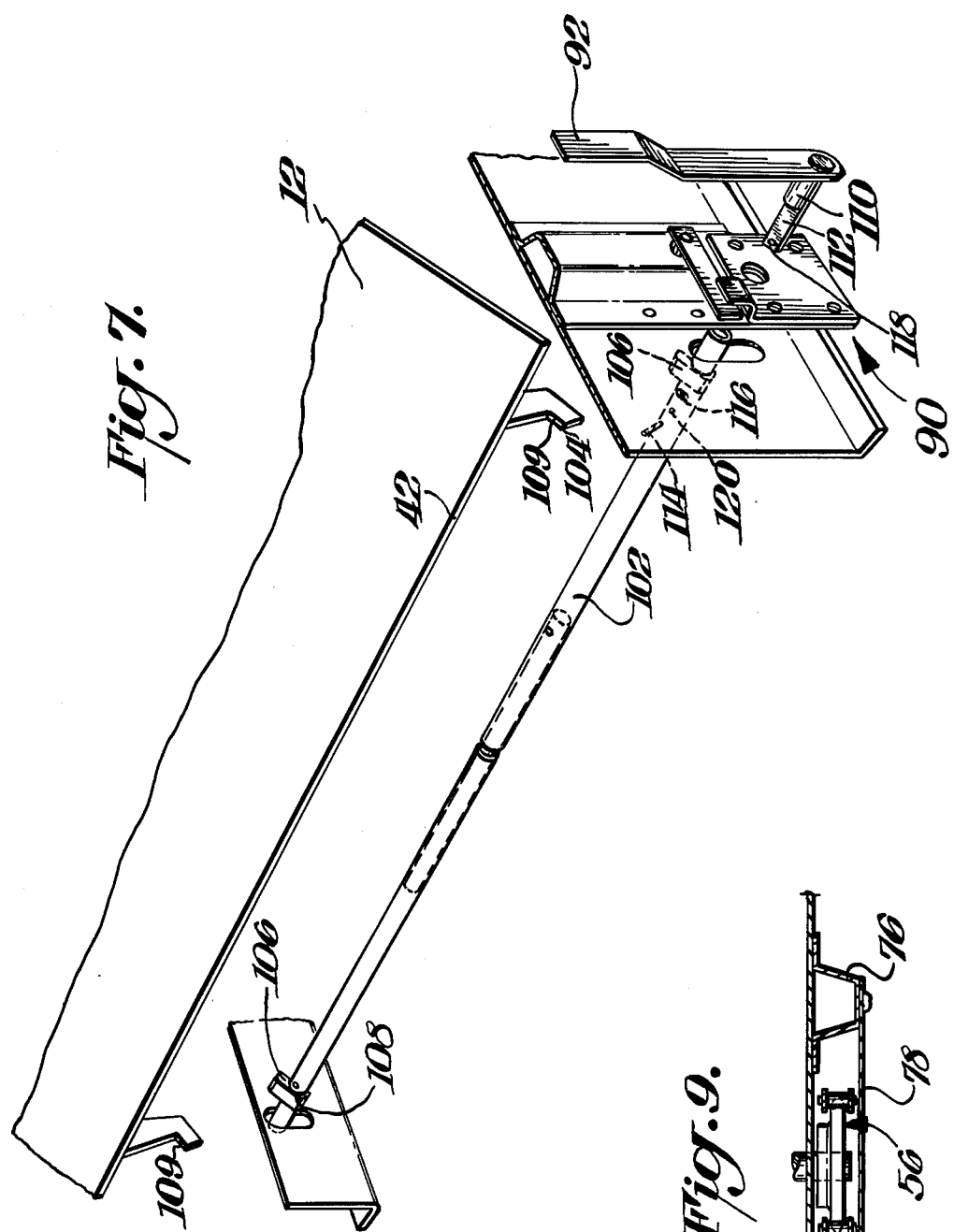
FIG. 7 is an exploded three-dimensional view of the clamping mechanism shown in FIG. 6.

FIG. 7 shows in exploded view, the parts of clamping mechanism 90 in conjunction with clamping hooks 104 attached to free edge 42 of slope sheet 12. Clamping shaft 102 is tubular and includes clamping lugs or pawls 106 welded in slots 108 aligned with hooks 104 for pressing downwardly on clamping shoulders 109 of hooks 104 to hold slope sheets 12 against grating 18 as later described in conjunction with FIG. 8. FIG. 7 shows the assembly of handle 92 with clamping shaft 102 in which handle shaft 110 has a milled flat 112 which engages under clamping pawl 106 to cause clamping shaft 102 to rotate with handle shaft 110 and handle 92. Handle 92 and handle shaft 110 can move axially in and out of clamping shaft 102 in the space provided between retaining pin 114 and stop 116 welded inside of clamping tube 102. Retaining pin 114 is inserted in retaining hole 118 of handle shaft 110 through access holes 120 in clamping tube 102 or removed through it when handle 92 is in the inwardly stowed position.

Figure 8:
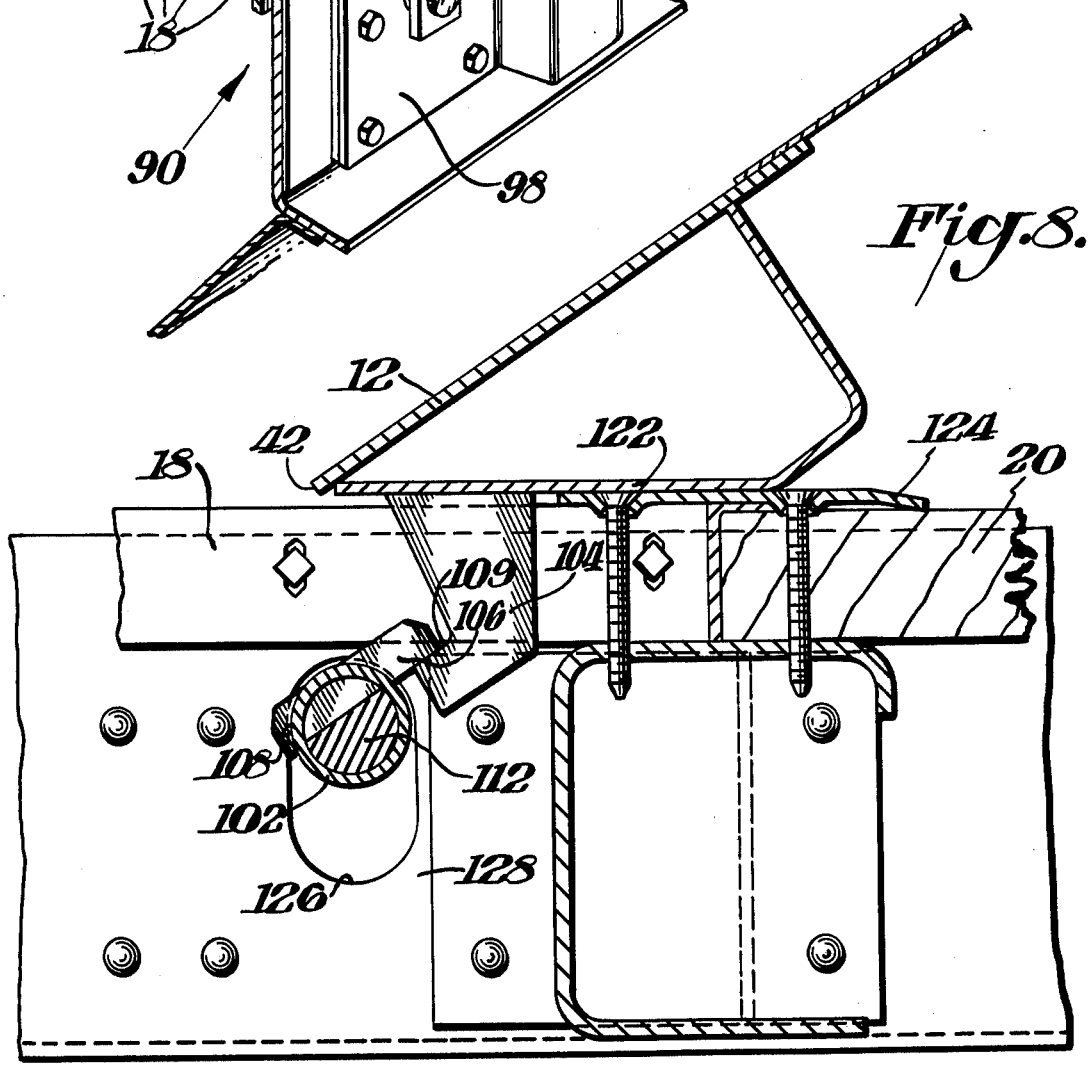
FIG. 8 is a cross-sectional view showing the clamping mechanism of FIGS. 6 and 7 in the clamped position.

FIG. 8 shows the downwardly locked position of slope sheet 12 against grating 18 by the junction of clamping pawl 106 over clamping shoulder 109 on hook 104 through an opening in grating 18. Hook 104 is welded to the bottom of angular shoe 122 at the bottom of slope sheet 12, which rests against bridging plate 124 between grating 18 and wooden floor section 20 on both ends of grating 18. Free edge 42 of slope sheet 12 is accordingly maintained closely adjacent or against grating 18 for all practical purposes. FIG. 8 also shows how clamping tube 102 is mounted within elongated slot 126 in side rail 128 of body 10. The clamped down position shown in FIG. 8 of slope sheet 12 also maintains side flanges 30 of slope sheet 12 in close engagement with shelf channels 32 to seal slope sheet 12 against sidewalls 28.

We claim:

1. A convertible vehicle body for transporting loose bulk or discrete cargo comprising a substantially rectangular floor, sidewalls, and roof forming said body, a hopper mounted below a portion of said floor for collecting and discharging bulk cargo disposed above it, the portion of said floor above said hopper comprising a grating capable of supporting said discrete cargo and having openings for permitting said loose bulk cargo to pass through it, hinge means within said body adjacent the ends of said roof, a slope sheet disposed in the ends of said body on both sides of said hopper for alternatively forming an inclined continuation of said hopper for transporting loose bulk cargo or for retraction upwardly therefrom to permit the entire length of the body to be used for transporting discrete cargo, the outer end of each of the slope sheets being rotatably connected within the body by the hinge means, flexible hoisting means connected from the roof of the body to the inner ends of each of the slope sheets for raising and lowering the inner ends from adjacent the roof of the body to the floor grating, operating means connected to the flexible hoisting means for raising and lowering the inner ends of the slope sheets, latching means disposed adjacent the roof of the body and the raised inner ends of the slope sheets whereby said raised inner ends of the slope sheets are detachably secured, unlatching means connected to the latching means whereby the inner ends of the slope sheets may be released for lowering, slanting shelf channels on the inner sides of the body corresponding to the position of the sides of the slope sheets when they are in the hopper containing position, the outsides of the slope sheets being constructed and arranged for engaging the shelf channels to form a substantially tight seal therewith for preventing loose bulk cargo from passing between the sides of the slope sheets and the insides of the side walls, a pair of spools are provided for the inner end of each slope sheets which are disposed adjacent opposite sidewalls of the body, a transverse shaft extending across the top of the body and connected to each of the spools, a stub shaft extending outwardly from one of the spools, said drive means being connected to the stub shaft for rotating the spools, an operating handle is provided outside the vehicle in a position approximately under one of the spools, a chain and sprocket transmission connecting the operating handle to the stub shaft whereby the slope sheets may be raised and lowered from the outside of the body, the body has external vertical ribs, said chain and sprocket drive is disposed between a pair of said ribs, and a cover is mounted upon and across said pair of ribs to cover said chain and sprocket transmission.

2. A convertible vehicle body as set forth in claim 1, wherein the flexible hoisting means each comprises a flexible belt, a spool for winding and unwinding the belt, a rotatable shaft mounting the spool adjacent and within the roof of the body approximately over the positions of the inner ends of the slope sheets, an idler roller rotatably mounted in the body adjacent each spool and roof, said belt being engaged with said spool and passing over said idler rollers, the ends of said belts remote from said spool being attached to the inner ends of said slope sheets, and said operating means comprising drive means connected to said spools for winding and unwinding said belts.

3. A convertible vehicle body as set forth in claim 2 wherein said latching means comprises movable pawls which engage the inner ends of the slope sheets in the raised position to hold them up.

4. A convertible vehicle body as set forth in claim 1 wherein said latching means comprises disengageable latching pawls rotatably mounted about said transverse shafts, said latch disengaging means each comprising a pull rod linkage, the upper end of which is connected to the latching pawls, and each of said pull rod linkage being disposed between said pair of ribs and having an operating rod disposed adjacent the slope sheet-operating handle.

5. A convertible vehicle body as set forth in claim 4 wherein the latching pawls are mounted upon an auxiliary shaft, and said auxiliary shaft being mounted adjacent to said transverse shaft.

6. A convertible vehicle body for transporting loose bulk or discrete cargo comprising a substantially rectangular floor, sidewalls, and roof forming said body, a hopper mounted below a portion of said floor for collecting and discharging bulk cargo disposed above it, the portion of said floor above said hopper comprising a grating capable of supporting said discrete cargo and having openings for permitting said loose bulk cargo to pass through it, hinge means within said body adjacent the ends of said roof, a slope sheet disposed in the ends of said body on both sides of said hopper for alternatively forming an inclined continuation of said hopper for transporting loose bulk cargo or for retraction upwardly therefrom to permit the entire length of the body to be used for transporting discrete cargo, the outer end of each of the slope sheets being rotatably connected within the body by the hinge means, flexible hoisting means connected from the roof of the body of the inner ends of each of the slope sheets for raising and lowering the inner ends from adjacent the roof of the body of the floor grating, operating means connected to the flexible hoisting means for raising and lowering the inner ends of the slope sheets, latching means disposed adjacent the roof of the body and the raised inner ends of the slope sheets whereby said raised inner ends of the slope sheets are detachably secured, unlatching means connected to the latching means whereby the inner ends of the slope sheets may be released for lowering, slanting shelf channels on the inner sides of the body corresponding to the position of the sides of the slope sheets when they are in the hopper containing position, the outsides of the slope sheets being constructed and arranged for engaging the shelf channels to form a substantially tight seal therewith for preventing loose bulk cargo from passing between the sides of the slope sheets and the insides of the side walls, clamping means is provided for securing the lower inner ends of the slope sheets to the floor of the body adjacent the grating, the clamping means comprising a clamping shaft rotatably mounted within the top of the hopper just under the grating, locking hooks disposed on the ends of the slope sheets in a position for passing through openings in the grating, locking pawls mounted within the hopper on the clamping shaft in line with the locking hooks and disposed to pass through said spaces in the grating as the locking hooks, and clamping handle means connected to the clamping shaft and disposed outside of the body for rotating the clamping shaft to engage the locking hooks and pull them down, whereby the inner ends of the slope sheets are secured to the floor against the grating and the outsides of the slope sheets are firmly engaged within the shelf channels.

7. A convertible vertical body as set forth in claim 6 wherein the clamping handles are disposed between pairs of vertical ribs on the outside of the body, said clamping handles including extendable shafts extending through the sidewall of the body into engagement within the clamping shafts, and the extendable shafts being telescopically engaged within the clamping shafts whereby the extendable shafts can be pulled away from the side of the body for operating movement and moved back against the side of the body for clamping and stowing.

* * * * *